United States Patent
Walter et al.

(10) Patent No.: US 7,684,945 B2
(45) Date of Patent: Mar. 23, 2010

(54) METHOD FOR THE CALIBRATION OF A YAW RATE MEASUREMENT

(75) Inventors: Michael Walter, Neuravensburg (DE); Matthias Zobel, Wasserburg (DE); Johannes Hoer, Stein (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 0 days.

(21) Appl. No.: 12/226,704

(22) PCT Filed: Apr. 19, 2007

(86) PCT No.: PCT/DE2007/000693

§ 371 (c)(1),
(2), (4) Date: Oct. 24, 2008

(87) PCT Pub. No.: WO2007/121720

PCT Pub. Date: Nov. 1, 2007

(65) Prior Publication Data

US 2009/0089002 A1 Apr. 2, 2009

(30) Foreign Application Priority Data

Apr. 25, 2006 (DE) .................. 10 2006 018 874

(51) Int. Cl.
*G01C 17/38* (2006.01)

(52) U.S. Cl. .................. 702/96; 348/148; 701/41; 702/92; 702/94; 702/104

(58) Field of Classification Search .............. 702/87, 702/94, 96, 104, 151, 92; 701/29, 41, 72; 707/5; 348/148
See application file for complete search history.

(56) References Cited

U.S. PATENT DOCUMENTS

| | | | |
|---|---|---|---|
| 4,470,124 A | 9/1984 | Tagami et al. | 702/87 |
| 5,274,576 A | 12/1993 | Williams | 707/5 |
| 5,719,790 A | 2/1998 | Lohrenz et al. | 702/104 |
| 5,857,160 A * | 1/1999 | Dickinson et al. | 701/41 |
| 6,130,706 A * | 10/2000 | Hart et al. | 348/148 |
| 6,317,674 B1 | 11/2001 | Lohberg et al. | 701/72 |
| 6,718,279 B2 | 4/2004 | Büstgens et al. | 702/151 |
| 6,810,311 B2 | 10/2004 | Winner et al. | 701/29 |
| 6,915,228 B2 * | 7/2005 | Uffenkamp et al. | 702/94 |

FOREIGN PATENT DOCUMENTS

DE 690 14 108 6/1995

(Continued)

*Primary Examiner*—John H Le
(74) *Attorney, Agent, or Firm*—W. F. Fasse; W. G. Fasse

(57) ABSTRACT

In a method for the calibration of a yaw rate measurement in a motor vehicle, the motor vehicle features at least one device for determining the yaw rate, a camera system which is oriented in the forward direction, and, if applicable, a steering angle sensor or a lateral acceleration sensor. At least one initial calibration is carried out at a standstill and at least one second calibration is carried out when the motor vehicle is moving. The second calibration uses image data of the camera system, which detects the environment in front of the motor vehicle, to predict the course of the roadway lane on which the vehicle is driving, from which the yaw rate is estimated.

13 Claims, 1 Drawing Sheet

FOREIGN PATENT DOCUMENTS

| | | |
|---|---|---|
| DE | 195 02 858 | 7/1996 |
| DE | 195 25 217 | 1/1997 |
| DE | 693 27 418 | 7/2000 |
| DE | 199 10 868 | 9/2000 |
| DE | 101 28 056 | 11/2002 |
| DE | 103 27 695 | 1/2005 |
| EP | 0 563 885 | 12/1999 |
| EP | 1 258 708 | 11/2002 |
| EP | 0 893 320 | 10/2003 |
| JP | 11-037774 | 2/1999 |
| JP | 11-094874 | 4/1999 |
| JP | 2002-202319 | 7/2002 |

* cited by examiner

METHOD FOR THE CALIBRATION OF A YAW RATE MEASUREMENT

FIELD OF THE INVENTION

The invention relates to a method for the calibration of a yaw rate measurement in a motor vehicle.

BACKGROUND INFORMATION

An accurate determination of the yaw rate in a motor vehicle is of interest e.g. for driver's assistance systems such as ESP (electronic stability program), ABS (antiblock system). Besides, knowledge of the yaw rate and of an angle of roll derivable therefrom is of importance for sensor systems to detect the environment. Short-term changes of the angle of roll of a vehicle, as they appear e.g. when cornering, complicate e.g. an accurate lane prediction. An accurate knowledge of the yaw rate and/or the angle of roll can be used to correct the sensor data.

The output signal of a yaw rate sensor is subject to certain malfunction influences, so e.g. due to the temperature dependency of the sensor the output signal can drift slowly. Thus, for an accurate determination of the yaw rate the calibration of the measurement values is also necessary during operation of the vehicle.

SUMMARY OF THE INVENTION

It is, therefore, object of the present invention to indicate a method for the calibration of a yaw rate measurement which is carried out during operation of the motor vehicle.

This object is solved according to the invention by a method for the calibration of a yaw rate measurement in a motor vehicle, as disclosed and claimed herein.

A method for the calibration of a yaw rate measurement in a motor vehicle is presented, which is carried out during operation of the motor vehicle. The motor vehicle comprises at least one device for determining the yaw rate, a steering angle sensor and a camera system which is in the forward-position, which detects the vehicle environment in the direction of driving. For determining the yaw angle with high accuracy, at least one initial calibration of the measured yaw rate is carried out at a standstill and at least one second calibration is carried out when the motor vehicle is moving.

The vehicle standstill can be recognized e.g. on the basis of a measurement of the speed. As an alternative also the position of the hand brake (activated or not), the position of the gear lever (gear engaged or not), the yaw rate, the wheel speed etc. can serve as an indicator. The indicators can also be optionally linked with each other. For example, a standstill of the vehicle is assumed, if no gear is engaged and the hand brake is activated. If the yaw rate changes strongly within a predetermined time interval, it is assumed that the vehicle is moving. In a preferred embodiment of the invention the image data of at least one image sensor are used in a calibration when the vehicle is moving, wherein the image sensor detects the environment in front of the motor vehicle. From the image data a lane is predicted. From the course of the lane, the vehicle's driving straight ahead or its cornering and thus the yaw rate are estimated. From the yaw rate $\omega_z$ and the vehicle speed v, also the transverse acceleration of the vehicle can be determined with the relation $a_y = v\omega_z$.

In a special embodiment of the invention the steering angle is used for calibration when the vehicle is moving. This is in particular the case, if an estimation of the yaw rate from a camera picture is not successful.

In a preferred embodiment of the invention with standstill of the vehicle the yaw rate values are averaged over a certain period of time and the averaged value is used as a correction value for future measurements. For the averaging the first and the last value and values which strongly deviate from the adjacent measurement values are not taken into consideration.

In a preferred embodiment of the invention the output value of the yaw rate is compensated in several steps. Connecting the correction value in small steps within a certain time interval is particularly reasonable in case the correction value exceeds a predetermined value. Likewise it is possible instead to continuously correct the output values at a predetermined time interval.

BRIEF DESCRIPTION OF THE DRAWING

In the following the invention is further described on the basis of examples of embodiment and of a drawing, in which.

DETAILED DESCRIPTION OF AN EXAMPLE EMBODIMENT OF THE INVENTION

Figure 1:
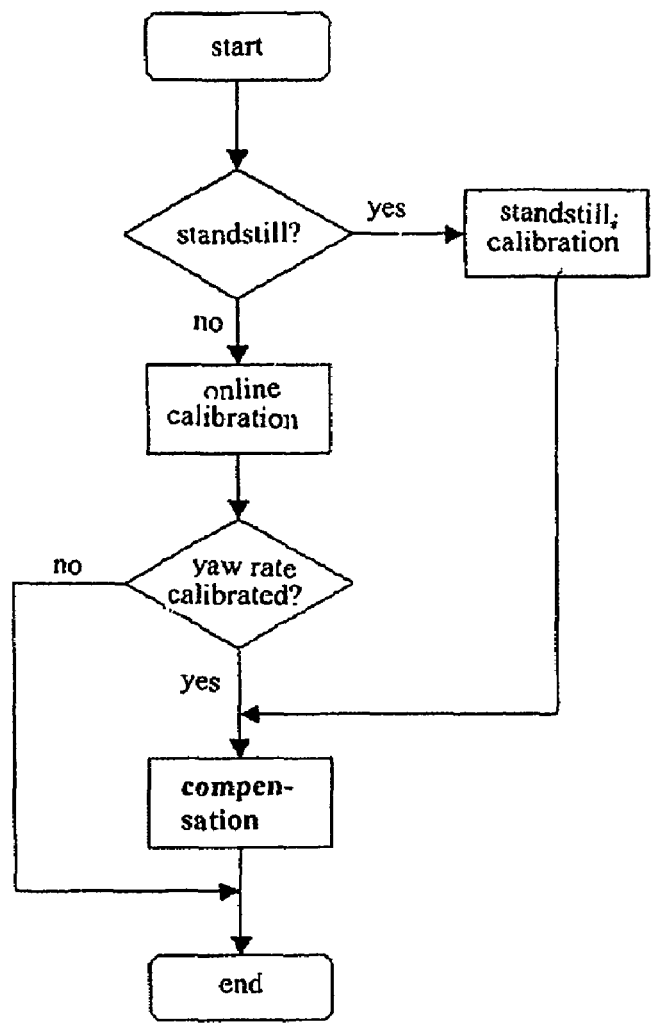
FIG. 1 shows a schematic representation of a method for calibration of the yaw rate.

A method for calibration of the yaw rate is schematically represented in FIG. 1. After the start of the method, at first the movement condition of the vehicle is tested. If it is in the standstill, then the standstill calibration provided for it is carried out. If a correction value results, then the output value of the yaw rate in the compensation stage is correspondingly adapted. If the vehicle is not in the standstill, then an on-line calibration is carried out. For this purpose the image data of at least one image sensor are used. The image sensor detects the environment in front of the motor vehicle, and from the course of the driving lane on the roadway, the vehicle's driving straight ahead or its cornering and thus the yaw rate are estimated. For example, driving straight ahead is recognized, if the vehicle exceeds a predetermined speed. In this example this speed lies between 80 and 100 km/h. A further indicator for driving straight ahead is, if the curvature of the predicted lane exceeds a predetermined radius. In this example such a predetermined radius is 2000 m. On the basis of the mentioned indicators vehicle speed, radius of curvature and lane it is derived whether the vehicle is currently driving straight ahead. From the disclosure herein, it will be apparent for the skilled person, that in further examples of embodiment other indications, such as e.g. the transverse acceleration and/or the steering angle, and other predetermined limiting values can be indicated. A calibration is carried out, if it has been determined that the vehicle drives straight ahead. It is also conceivable to carry out calibration in a curve, if the curvature can be detected in a sufficiently accurate manner with the system for detecting the environment. For this purpose within a predetermined time interval, which as a rule is one or a few minutes, the yaw rate is recorded, averaged and a correction value is determined. If the radius of curvature of the lane cannot be determined or used, e.g. due to bad weather conditions or bad roadway lane markings, then only the standstill calibration is used. In a further embodiment of the invention in this case the steering angle and/or the transverse acceleration is used for online calibration. The output value of the yaw rate is compensated in several steps, so that only after a predetermined time interval from a few seconds to minutes the output value is completely corrected.

The invention claimed is:

1. A method for the calibration of a yaw rate measurement in a motor vehicle, wherein the motor vehicle features at least one device for determining the yaw rate and a camera system, and optionally further features a steering angle sensor or a transverse acceleration sensor, characterized in that the camera system is oriented to detect an environment in front of the motor vehicle, a first calibration is carried out when the motor vehicle is at a standstill, and a second calibration is carried out when the motor vehicle is moving, wherein for the second calibration when the vehicle is moving, the camera system detects the environment in front of the motor vehicle to produce image data, and a roadway lane on which the motor vehicle is driving is predicted from the image data, and a yaw rate is estimated from at least a course of the roadway lane as determined from the image data, and an actual yaw rate measurement is compensated based on the estimated yaw rate to produce a calibrated output value of the yaw rate.

2. A method according to claim 1, characterized in that for the second calibration when the vehicle is moving, a steering angle as determined by the steering angle sensor and/or a transverse acceleration as determined by the transverse acceleration sensor is additionally used for the estimation of the yaw rate, in particular if an estimation of the yaw rate from the image data alone is not sufficient.

3. A method according to claim 1, characterized in that with the standstill of the vehicle, yaw rate values are determined and averaged over a certain period of time to determine an averaged value, and the averaged value is used as a correction value of the actual yaw rate measurement.

4. A method according to claim 1, characterized in that the actual yaw rate measurement is compensated in several steps.

5. A method of calibrating a yaw rate measurement in a motor vehicle that includes a camera system and an arrangement for measuring a yaw rate of said motor vehicle, wherein said camera system is oriented to detect an environment in front of said motor vehicle, and said method comprises the steps:

measuring a measured yaw rate of said motor vehicle;

determining whether said motor vehicle is at a standstill or is driving;

performing a first calibration of said measured yaw rate when said motor vehicle is at a standstill;

performing a second calibration of said measured yaw rate when said motor vehicle is driving;

wherein said second calibration comprises:

detecting said environment in front of said motor vehicle using said camera system to produce image data;

evaluating said image data to determine therefrom a predicted driving lane on a roadway on which said motor vehicle is driving;

determining a predicted course of said driving lane;

from said predicted course of said driving lane, determining an estimated yaw rate of said motor vehicle driving along said predicted course of said driving lane; and calibrating said measured yaw rate based on at least said estimated yaw rate.

6. The method according to claim 5, wherein said second calibration is performed when said motor vehicle is currently driving straight.

7. The method according to claim 6, wherein said step of determining whether said motor vehicle is at a standstill or is driving includes determining a driving speed of said motor vehicle, and further comprising a step of concluding that said motor vehicle is currently driving straight when said driving speed exceeds a prescribed speed threshold.

8. The method according to claim 7, wherein said step of determining said predicted course of said driving lane includes determining a radius of curvature of said driving lane, and further comprising a step of concluding that said motor vehicle is currently driving straight when said radius of curvature exceeds a prescribed speed threshold.

9. The method according to claim 5, wherein said second calibration is performed when said motor vehicle is currently driving on a curve;

wherein said step of determining said predicted course of said driving lane includes determining a radius of curvature of said driving lane;

further comprising a step of concluding from said radius of curvature that said motor vehicle is currently driving on a curve;

wherein said step of measuring said measured yaw rate comprises recording and averaging said measured yaw rate over a prescribed time interval; and wherein said step of calibrating said measured yaw rate comprises determining from said estimated yaw rate a correction value for said recorded and averaged measured yaw rate.

10. The method according to claim 5, wherein said motor vehicle further includes at least one of a steering angle sensor or a lateral acceleration sensor, further comprising at least one of producing a steering angle value from said steering angle sensor or producing a lateral acceleration value from said lateral acceleration sensor, and wherein said calibrating of said measured yaw rate is further based on at least one of said steering angle value or said lateral acceleration value if said estimated yaw rate is insufficient for said calibrating.

11. The method according to claim 5, wherein said first calibration comprises recording and averaging measured values of said measured yaw rate over a prescribed time interval to determine an average yaw rate value, and using said average yaw rate value as a correction value for said measured yaw rate.

12. The method according to claim 5, wherein said calibrating of said measured yaw rate is performed in several successive calibration steps of correcting said measured yaw rate successively partially toward said estimated yaw rate respectively in said successive calibration steps.

13. A method of calibrating a yaw rate measurement in a motor vehicle that includes a camera system and an arrangement for measuring a yaw rate of said motor vehicle, wherein said camera system is oriented to detect an environment in front of said motor vehicle, and said method comprises the steps:

measuring a measured yaw rate of said motor vehicle;

determining whether said motor vehicle is at a standstill or is driving;

performing a first calibration of said measured yaw rate when said motor vehicle is at a standstill, or performing a second calibration of said measured yaw rate when said motor vehicle is driving;

wherein said second calibration comprises:

detecting said environment in front of said motor vehicle using said camera system to produce image data;

evaluating said image data to determine therefrom a predicted driving lane on a roadway on which said motor vehicle is driving;

determining a predicted course of said driving lane including a radius of curvature of said driving lane;

from said predicted course of said driving lane, determining an estimated yaw rate of said motor vehicle driving along said predicted course of said driving lane having said radius of curvature; and calibrating said measured yaw rate based on at least said estimated yaw rate;

wherein said second calibration is performed when said radius of curvature of said driving lane can be adequately determined; and wherein only said first calibration is performed if in an attempt to perform said second calibration it is determined that said radius of curvature cannot be adequately determined.

* * * * *

UNITED STATES PATENT AND TRADEMARK OFFICE
CERTIFICATE OF CORRECTION

| | | |
|---|---|---|
| PATENT NO. | : 7,684,945 B2 | Page 1 of 1 |
| APPLICATION NO. | : 12/226704 | |
| DATED | : March 23, 2010 | |
| INVENTOR(S) | : Michael Walter et al. | |

It is certified that error appears in the above-identified patent and that said Letters Patent is hereby corrected as shown below:

On the Title page,
Item [30], Foreign Application Priority Data,
Line 1, replace "10 2006 018 874" by --10 2006 018 974.4--;

Column 4,
Line 5, after "claim", replace "7" by --6--.

Signed and Sealed this
Seventh Day of June, 2011

David J. Kappos
*Director of the United States Patent and Trademark Office*